US011132534B2

(12) United States Patent
Goto

(10) Patent No.: US 11,132,534 B2
(45) Date of Patent: Sep. 28, 2021

(54) MONITORING SYSTEM

(71) Applicant: Yazaki Corporation, Tokyo (JP)

(72) Inventor: Jun Goto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 75 days.

(21) Appl. No.: 16/452,824

(22) Filed: Jun. 26, 2019

(65) Prior Publication Data

US 2020/0012848 A1 Jan. 9, 2020

(30) Foreign Application Priority Data

Jul. 3, 2018 (JP) .............................. JP2018-126749

(51) Int. Cl.
| | |
|---|---|
| *G06K 9/00* | (2006.01) |
| *G06T 7/50* | (2017.01) |
| *G06T 7/246* | (2017.01) |
| *B60Q 9/00* | (2006.01) |
| *G06T 17/00* | (2006.01) |

(Continued)

(52) U.S. Cl.
CPC .......... *G06K 9/00355* (2013.01); *B60Q 9/00* (2013.01); *G06K 9/00375* (2013.01); *G06K 9/00838* (2013.01); *G06T 7/246* (2017.01); *G06T 7/50* (2017.01); *G06T 17/00* (2013.01); *B60R 11/04* (2013.01); *B60R 2011/0003* (2013.01); *G06T 2200/04* (2013.01); *G06T 2200/08* (2013.01); *G06T 2207/30196* (2013.01); *G06T 2207/30268* (2013.01)

(58) Field of Classification Search
CPC .......... G06K 9/00355; G06K 9/00375; G06K 9/00838; G06T 7/50; G06T 7/246; G06T 17/00; G06T 2200/04; G06T 2200/08; G06T 2207/30196; G06T 2207/30268; B60Q 9/00; B60R 11/04; B60R 2011/0003; E05Y 2400/858; E05Y 2400/86; E05F 15/73
See application file for complete search history.

(56) References Cited

U.S. PATENT DOCUMENTS

| | | | | |
|---|---|---|---|---|
| 2011/0307146 | A1* | 12/2011 | Yang ..................... | B60R 21/013 701/36 |
| 2014/0314277 | A1* | 10/2014 | Brown .................... | G06T 17/00 382/103 |

(Continued)

FOREIGN PATENT DOCUMENTS

| | | |
|---|---|---|
| JP | 2014-203317 A | 10/2014 |
| JP | 2015209154 A | 11/2015 |

(Continued)

*Primary Examiner* — Zhitong Chen
(74) *Attorney, Agent, or Firm* — Sughrue Mion, PLLC

(57) ABSTRACT

A monitoring system includes an imaging unit configured to capture a depth image including a distance to a monitoring target person in a vehicle cabin, an estimation unit configured to estimate a three-dimensional human body model of the monitoring target person from the depth image captured by the imaging unit, and a monitoring unit configured to detect a get-off motion by monitoring a motion of a monitoring target portion of the human body model approaching the monitoring coordinate regarding a door manipulation in the cabin on the basis of the human body model estimated by the estimation unit.

20 Claims, 8 Drawing Sheets

(51) Int. Cl.
*B60R 11/04* (2006.01)
*B60R 11/00* (2006.01)

(56) References Cited

U.S. PATENT DOCUMENTS

2016/0155003 A1* 6/2016 Venetianer .......... G06F 16/7847
                                                    348/143
2018/0229725 A1   8/2018 Akama et al.
2018/0285635 A1* 10/2018 Arata ................ G06K 9/00832

FOREIGN PATENT DOCUMENTS

JP    2017177883 A    10/2017
WO    2017056401 A1    4/2017

* cited by examiner

MONITORING SYSTEM

ROSS-REFERENCE TO RELATED APPLICATION(S)

The present application claims priority to and incorporates by reference the entire contents of Japanese Patent Application No. 2018-126749 filed in Japan on Jul. 3, 2018.

BACKGROUND OF THE INVENTION

1. Field of the Invention

The present invention relates to a monitoring system.

2. Description of the Related Art

As a monitoring system of the related art used in a cabin of a vehicle, for example, Japanese Patent Application Laid-open No. 2014-203317 discloses a monitoring system in which a movement of an occupant's arm to a door direction is recognized on the basis of captured data, and an occupant's body tilting Lo the door direction subsequent to the arm movement is recognized, and then it is determined that a get-off motion of the occupant occurs.

However, in the monitoring method of Japanese Patent Application Laid-open No. 2014-203317 described above, for example, the occupant's arm movement to the door direction and the occupant's tilted posture may be determined as a get-off motion of the occupant even when the occupant reclines for correcting a posture, moves to another seat, or turns around, or the like.

SUMMARY OF THE INVENTION

In view of the aforementioned problem, an object of the present invention is to provide a monitoring system capable of accurately recognizing a motion of the monitoring target person.

In order to achieve the above mentioned object, a monitoring system according to one aspect of the present invention includes an imaging unit configured to capture a depth image including a distance to a monitoring target person in a cabin of a vehicle; an estimation unit configured to estimate a three-dimensional human body model of the monitoring target person from the depth image captured by the imaging unit; and a monitoring unit configured to detect a get-off motion of the monitoring target person by monitoring a motion of a monitoring target portion of the three-dimensional human body model approaching a monitoring coordinate regarding a door manipulation in the cabin on the basis the three-dimensional human body model estimated by the estimation unit.

According to another aspect of the present invention, in the monitoring system, it is possible to configure that the monitoring unit detect the get-off motion by monitoring a motion of the monitoring target portion positioned inside a monitoring region of the cabin approaching the monitoring coordinate with respect to the monitoring coordinate point, and does not detect a motion of the monitoring target portion positioned outside the monitoring region approaching the monitoring coordinate as the get-off motion.

According to still another aspect of the present invention, in the monitoring system, it is possible to configure that the monitoring coordinate is three-dimensional coordinates of a door knob in the cabin, and the monitoring target portion is a hand of the monitoring target person.

According to still another aspect of the present invention, in the monitoring system, it is possible to further include that an operation controller configured to perform a process corresponding to the get-off motion when the get-off motion is detected on the basis of a monitoring result of the monitoring unit.

According to still another aspect of the present invention, in the monitoring system, it is possible to configure that the operation controller performs the process corresponding to the get-off motion when the get-off motion is detected on the basis of a monitoring result of the monitoring unit, and the vehicle is in a stop state.

According to still another aspect of the present invention, in the monitoring system, it is possible to further include that an alarming unit provided in the cabin to perform warning to the monitoring target person, wherein the operation controller causes the alarming unit to perform the process of warning about approach of an another vehicle when the get-off motion is detected on the basis of a monitoring result of the monitoring unit, and the another vehicle approaches the vehicle.

According to still another aspect of the present invention, in the monitoring system, it is possible to further include that a casing provided on a surface of a cabin side of a ceiling of the vehicle, the imaging unit and the monitoring unit being assembled to the casing.

The above and other objects, features, advantages and technical and industrial significance of this invention will be better understood by reading the following detailed description of presently preferred embodiments of the invention, when considered in connection with the accompanying drawings.

BRIEF DESCRIPTION CF THE DRAWINGS

DETAILED DESCRIPTION OF THE PREFERRED EMBODIMENTS

Embodiments of the present invention will now be described in details with reference to the accompanying drawings. Note that the invention is not limited to such embodiments. In addition, elements in the following embodiments encompass those easily substitutable by a person ordinarily skilled in the art or substantial equivalents.

Embodiments

Figure 1:
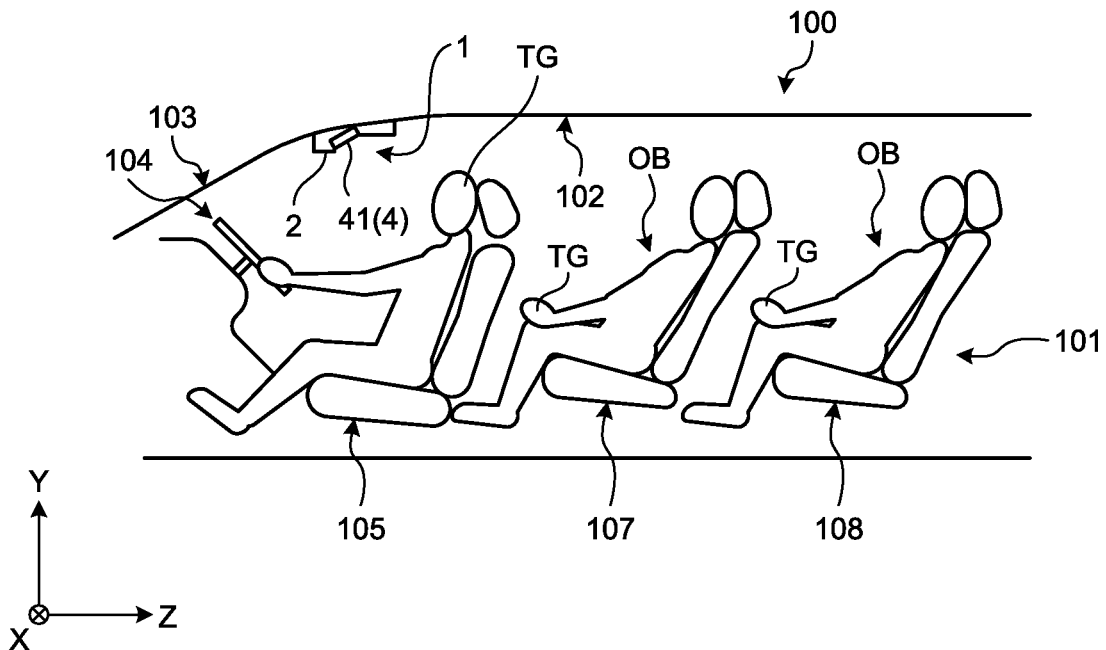
FIG. 1 is a schematic diagram illustrating a schematic configuration of a cabin of a vehicle to which a monitoring system according to an embodiment is applied.
Figure 2:
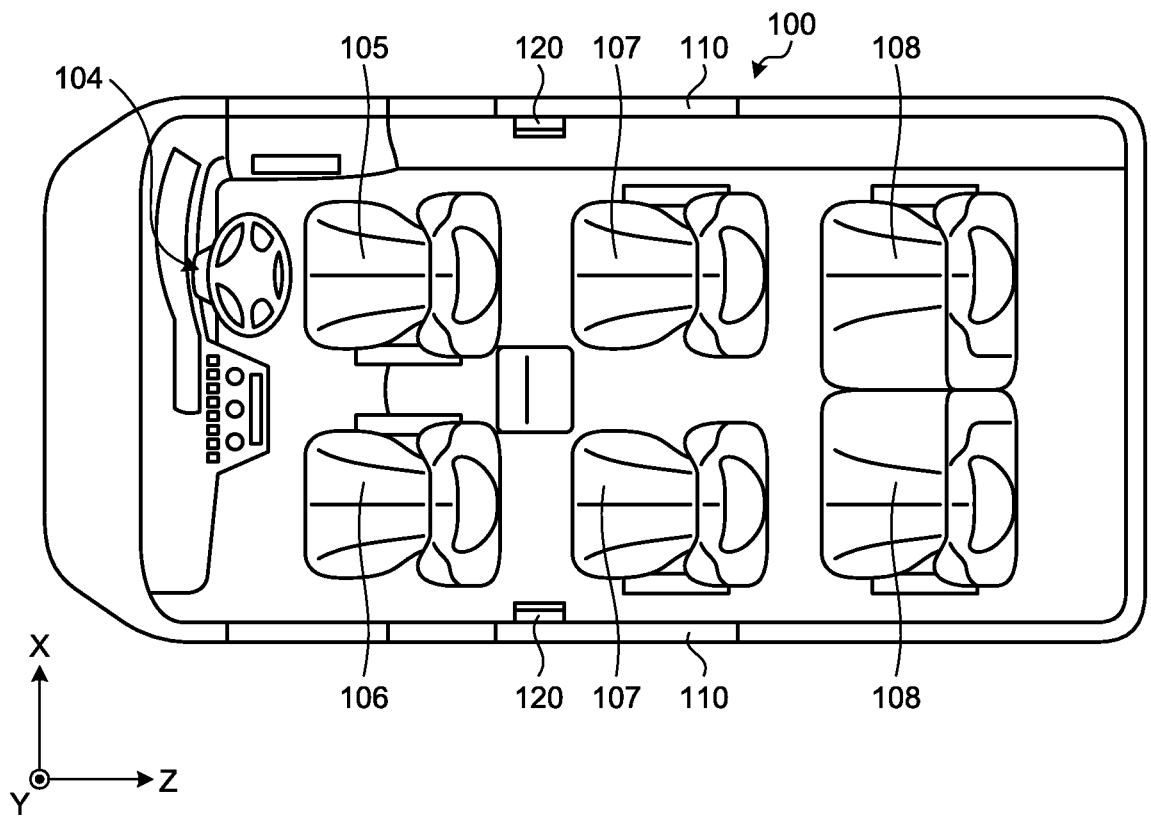
FIG. 2 is a schematic diagram illustrating a cabin of a vehicle to which the monitoring system according to an embodiment is applied.
Figure 3:
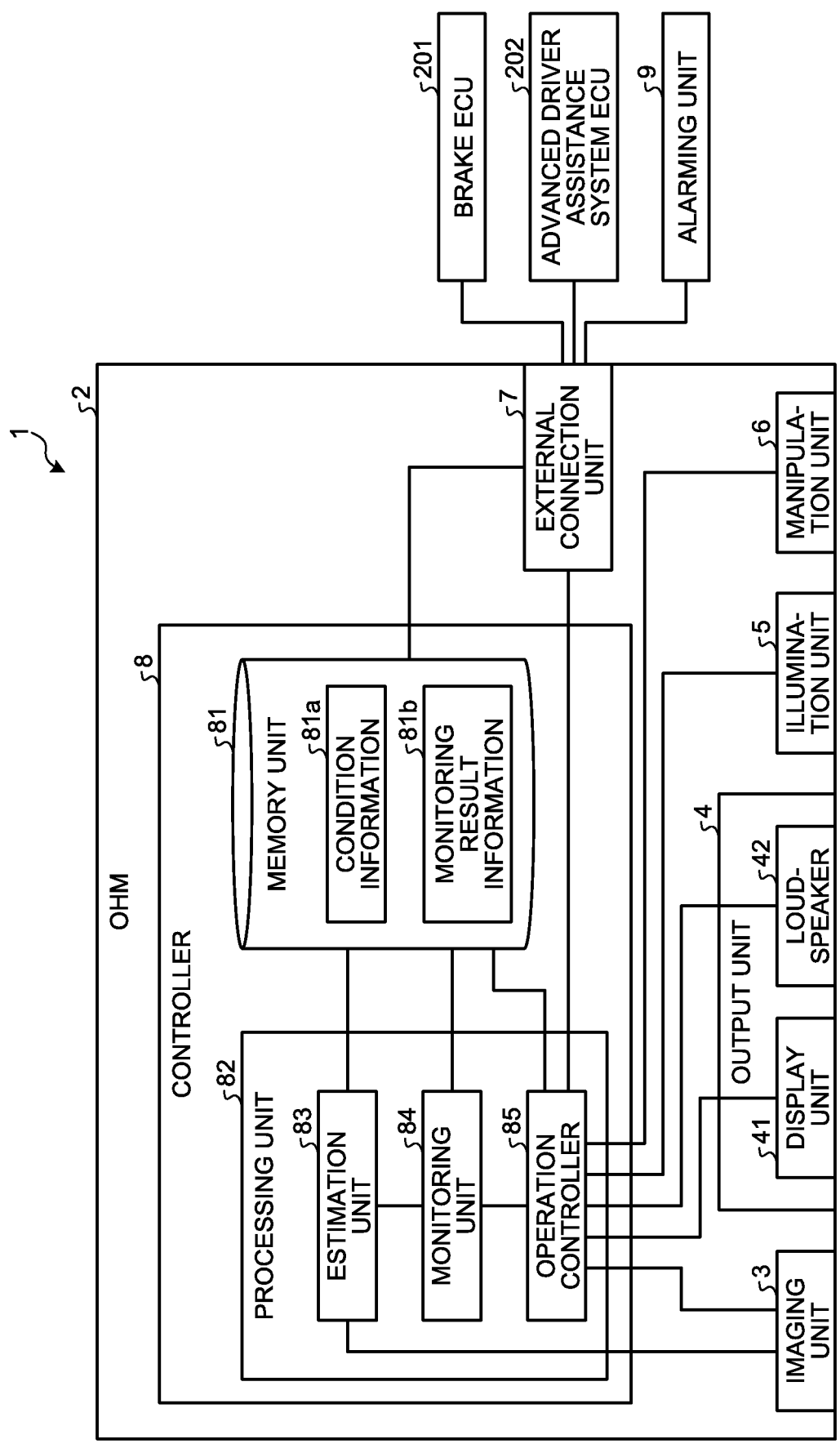
FIG. 3 is a block diagram illustrating a schematic configuration of the monitoring system according to an embodiment.
Figure 4:
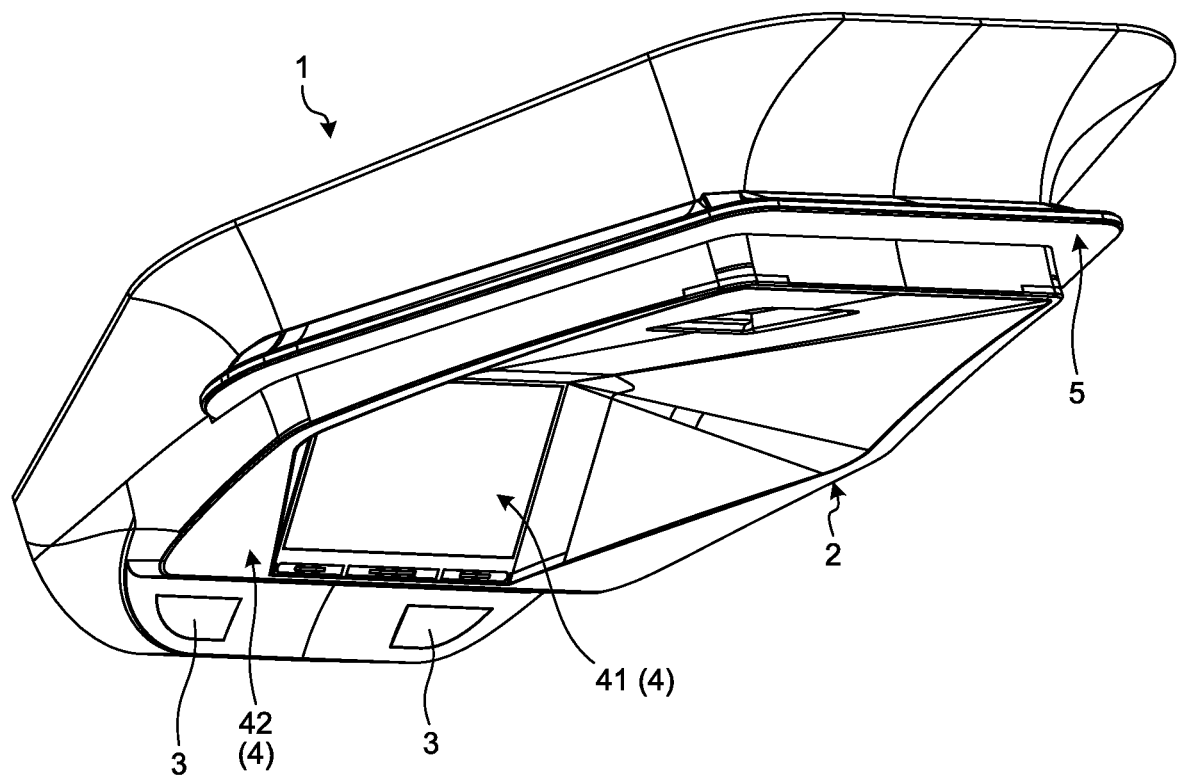
FIG. 4 is a perspective view illustrating appearance of the monitoring system according to an embodiment.
Figure 5:
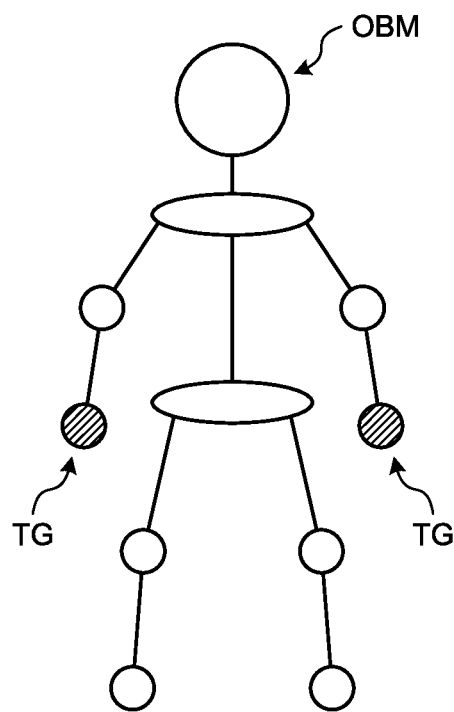
FIG. 5 is a diagram illustrating an exemplary human body model estimated by the monitoring system according to an embodiment.

Embodiments will be described with reference to FIGS. 1 to 5. FIG. 1 is a schematic diagram illustrating a schematic configuration of a cabin of a vehicle to which a monitoring system according to an embodiment is applied. FIG. 2 is a schematic diagram illustrating the cabin of the vehicle to which the monitoring system according to an embodiment is applied. FIG. 3 is a block diagram illustrating a schematic configuration of the monitoring system according to an embodiment. FIG. 4 is a perspective view illustrating appearance of the monitoring system according to an embodiment. FIG. 5 is a diagram illustrating an exemplary human body model estimated by the monitoring system according to an embodiment. Note that the arrow directions X of FIGS. 1 and 2 refer to a vehicle width direction of the vehicle 100. The arrow directions Y of FIGS. 1 and 2 refer to a height direction of the vehicle 100. The arrow directions Z of FIGS. 1 and 2 refer to a longitudinal direction (front/rear direction) of the vehicle 100. The arrow direction Z refers to a depth direction of the vehicle 100. In the following description, the vehicle 100 may also be referred to as a "host vehicle" in some cases.

The monitoring system 1 according to this embodiment illustrated in FIG. 1 is an in-vehicle system (vehicle cabin monitoring system) mounted on a vehicle 100 to monitor a monitoring target person OB in a cabin 101 of the vehicle 100 and performs various processes for the monitoring target person OB. The monitoring target person OB is a target person for the monitoring using the monitoring system 1. The monitoring target person OB is an occupant riding on the cabin 101 of the vehicle 100 and includes a driver of the vehicle 100 or a fellow passenger other than the driver.

In the example of FIGS. 1 and 2, the vehicle 100 includes a driver's seat 105, an assistant's seat 106, a second row backseat 107, and a third row backseat 108. The vehicle 100 is a walk-through vehicle by way of example. In other words, the vehicle 100 is a vehicle in which a passenger can move through the cabin 101 between the second row backseat 107 and the third row backseat 108 without overturning the seat. It is assumed that the monitoring target person OB according to this embodiment is a fellow passenger of the backseat 107 or 108 of the vehicle 100 by way of example. Note that, although the vehicle 100 is an automobile in this embodiment, the vehicle 100 may also include, for example, a bus, a train, or the like.

In the example of FIG. 2, the vehicle 100 has a rear door 110 through which the monitoring target person OB gets on or off. The door 110 of the vehicle 100 has a door knob 120 provided in the cabin side and used when the monitoring target person OB of the cabin gets off. In addition, the entire monitoring system 1 according to this embodiment is provided on a surface of the cabin 101 side of a ceiling 102 of the vehicle 100 and constitutes an over-head module (OHM) by integrating various functions.

A configuration of the monitoring system 1 will now be described in details with reference to FIGS. 1 to 5.

The monitoring system 1 has a casing 2, an imaging unit 3, an output unit 4, an illumination unit 5, a manipulation unit 6, external connection unit 7, a controller 8, and an alarming unit 9. Note that the monitoring system 1 constituting the over-head module may also additionally include, for example, a radio communication unit, an antenna, a power distribution unit, or the like.

The casing 2 houses each unit of the monitoring system 1. The casing 2 is formed in a hollowed box shape as a whole by combining a plurality of members. The casing 2 is formed of an insulating synthetic resin. Here, the imaging unit 3, the output unit 4, the illumination unit 5, the manipulation unit 6, the external connection unit 7, and the controller 8 are assembled and housed in the casing 2 and are modularized as an over-head module. The imaging unit 3, the output unit 4, the illumination unit 5, the manipulation unit 6, and the external connection unit 7 internally housed in the casing 2 are partially exposed to the outside. In addition, the casing 2 according to this embodiment is provided on a surface of the cabin 101 side of the ceiling 102 (roof panel) of the vehicle 100. The ceiling 102 is a structure connected to a vehicle chassis by interposing a pillar or the like and supported on the upper side in a vertical direction of the vehicle chassis. The vehicle 100 is divided into the cabin 101 and the exterior with respect to the ceiling 102 as a vertical boundary of the upper part. Here, the casing 2 is provided, for example, in an intersection between the ceiling 102 and a windshield 103 and at a substantial center of the width direction of the vehicle 100.

The imaging unit 3 includes a three-dimensional time-of-flight (TOT) camera, a distance image sensor, or the like for measuring a distance to the monitoring target person OB in the cabin 101 of the vehicle 100. The imaging unit 3 captures a depth image including the distance to the monitoring target person OB. The depth image captured by the imaging unit 3 according to this embodiment includes, for example, three-dimensional point group data representing distances (coordinates) to each point in the three-dimensional coordinates (XYZ coordinates) in the cabin 101. The three-dimensional point group data is data that three-dimensionally expresses a target captured by the imaging unit 3. The three-dimensional point group data includes coordinate values representing coordinates of each point in the XYZ coordinate system. The imaging unit 3 according to this embodiment has a function of capturing a depth image for measuring a three-dimensional position of the monitoring target portion TG of the monitoring target person OB in the cabin 101. The monitoring target portion TG includes, for example, an occupant's hand, hand/forearm, hand/arm, and the like. According to this embodiment, the imaging unit 3 can capture an image of a monitoring target person OB even under a dark environment by using the TOF camera.

The imaging unit 3 is provided in the casing 2 such that, for example, a lens is exposed to the outside of the casing 2, and an optical axis is oriented toward the driver's seat 105 or the backseat 107 side of the cabin 101. The imaging unit 3 is electrically connected to the controller 8 to receive or transmit an electric signal from/to each other and control the operations of each unit using the controller 8. For example, the imaging unit 3 outputs the captured depth image to the controller 8.

The output unit 4 outputs various types of information to the cabin 101 of the vehicle 100. Here, the output unit 4 has a display unit 41 and a loudspeaker 42. The display unit 41 is a display device for outputting visual information (such as graphic information or text information). The display unit 41 includes, for example, a thin liquid crystal display, a plasma display, an organic EL display, or the like. The loudspeaker 42 is an output device for outputting auditory information (such as voice information or sound information). Each of the display unit 41 and the loudspeaker 42 of the output unit 4 is electrically connected to the controller 8 to receive or transmit an electrical signal to/from each other, so that the operations of each unit are controlled by the controller 8.

The illumination unit 5 illuminates the cabin 101 of the vehicle 100 and includes, for example, a map lamp or the like. The illumination unit 5 is electrically connected to the controller 8 to transmit or receive an electric signal to/from each other, so that the operations of each unit are controlled by the controller 8.

The manipulation unit 6 is a manipulation device capable of inputting various manipulations from the cabin 101 side of the vehicle 100. The manipulation unit 6 includes, for example, a push button, a non-contact sensor such as a capacitive touch switch or an infrared sensor, or the like. The manipulation unit 6 is electrically connected to the controller 8 to transmit or receive an electric signal to/from each other, so that the operations of each unit are controlled by the controller 8.

The external connection unit 7 is a part to which electric devices outside the casing 2 are electrically connected. The external connection unit 7 includes various types of connectors or interface units. The alarming unit 9 is electrically connected to the external connection unit 7. The alarming unit 9 is provided for each door 110 of the cabin 101. The alarming unit 9 warns, for example, the monitoring target person OB who tries to open the door 110. The alarming unit 9 has, for example, a lamp, a loudspeaker, and the like. The alarming unit 9 is preferably provided in the door 110 or in the vicinity of the door 110 in order to inform the monitoring target person OB who tries to open the door 110. For example, when the alarming unit 9 warns approach of another vehicle to the host vehicle by light, the alarming unit 9 may turn on a red lamp depending on a distance to the host vehicle or an approaching situation of another vehicle. For example, in a case where the alarming unit 9 warns approach of another vehicle by sound, the alarming unit 9 may output a pattern such as voice data "vehicle is approaching" or a buzzer. Note that another vehicle may include, for example, an automobile, a motorcycle, a bicycle, or the like.

The external connection unit 7 is electrically connected to an electronic controller (ECU) that comprehensively controls each part of the vehicle 100, a rear module provided in a backseat side position on the surface of the cabin 101 side of the ceiling 102 of the vehicle 100, or the like. The external connection unit 7 is electrically connected to the controller 8 and an electric device outside the casing 2 to transmit or receive an electric signal to/from each other.

In the example of FIG. 3, the external connection unit 7 is electrically connected to, for example, a brake ECU 201 and an advanced driver assistance system (ADAS) ECU 202. The brake ECU 201 outputs vehicle information regarding a brake of the vehicle 100. The vehicle information includes, for example, information representing whether or not the vehicle is in a stop state. The advanced driver assistance system ECU 202 outputs surrounding situation information regarding surrounding situations of the vehicle 100. The surrounding situation information may contain, for example, surrounding image information obtained by capturing an external object such as a surrounding environment of the vehicle 100, a surrounding person of the vehicle 100, another vehicle, and an obstacle, external object information such as presence/absence of an external object, a relative distance or a relative speed from the external object, and a time-to-collision (TTC), or the like.

The controller 8 is a part for comprehensively controlling each unit of the monitoring system 1. The controller 8 executes various computation processes regarding condition monitoring or various supports for the monitoring target person OB. The controller 8 has an electronic circuit embedded with a microcomputer known in the art, including a central operation processing device such as a central processing unit (CPU), a micro processing unit (MPU), an application specific integrated circuit (ASIC), and a field programmable gate array (FPGA), a read only memory (ROM), a random access memory (RAM), and an interface. The controller 8 is electrically connected to the imaging unit 3, the output unit 4, the illumination unit 5, the manipulation unit 6, and the external connection unit 7. The controller 8 may transmit or receive various electric signals such as an image signal corresponding to the depth image captured by the imaging unit 3 or a driving signal for driving each part to/from each unit.

Specifically, the controller 8 includes a memory unit 81 and a processing unit 82 in terms of functional concept. The memory unit 81 and the processing unit 82 may transmit or receive various types of information to/from various devices electrically connected. The memory unit 81 is a storage device such as a memory. The memory unit 81 stores a condition or information necessary in various processes of the controller 8, various programs executed by the controller 8, or the like. In addition, the memory unit 81 also stores visual information such as a partial image displayed on the display unit 41 or auditory information such as sound output from the loudspeaker 42. Furthermore, the memory unit 81 may temporarily store information regarding the depth image captured by the imaging unit 3 or various types information obtained via the external connection unit 7. Various types of information are read from the memory unit 81 by the processing unit 82 as necessary. The processing unit 82 executes various programs stored in the memory unit 81 on the basis of various input signals or the like and executes various processes for implementing various functions by operating the program and outputting an output signal to each unit.

In the example of FIG. 3, the memory unit 81 stores condition information 81a and monitoring result information 81b. The condition information 81a contains a condition or information necessary to determine the get-off motion of the monitoring target person OB. An example of the condition information 81a will be described below. The monitoring result information 81b contains information representing a monitoring result for the get-off motion of the monitoring target person by monitoring a motion of the monitoring target portion of the monitoring target person OB approaching the monitoring coordinate regarding a door manipulation in the cabin on the basis of the depth image captured by the imaging unit 3. The monitoring result information 81b contains sequential three-dimensional coordinates of the monitoring target portion of the monitoring target person OB and the monitoring result.

More specifically, the processing unit 82 includes an estimation unit 83, a monitoring unit 84, and an operation controller 85 in terms of functional concept. The processing unit 82 implements the estimation unit 83, the monitoring unit 84, and the operation controller 85 by executing a program.

The estimation unit 83 estimates a three-dimensional human body model of the monitoring target person OB from the depth image captured by the imaging unit 3. For example, the estimation unit 83 extracts the monitoring target person OB from the depth image on the basis of a background subtraction method, a random forest method, a mean shift method, pattern matching, or the like, and estimates a human body model on the basis of a contour of the monitoring target person OB or the like. The human body model OBM of FIG. 5 is a model that expresses a skeletal position of the monitoring target person OB. In the example of FIG. 5, the human body model OBM characteristically expresses a human body part such as a head, a shoulder, an elbow, a hand, a hip, a knee, and a leg of the monitoring target person OB. In addition, the estimation unit 83 extracts the monitoring target person OB from the depth image on the basis of the coordinate values of each point indicated by the three-dimensional point group data of the depth image, and estimates the human body model OBM by focusing on the skeleton position of the monitoring target person OB. An example of the estimation process of the human body model OBM will be described below. The estimation unit 83 specifies the monitoring target portion TG from each human body part of the estimated human body model OBM, and calculates three-dimensional coordinates of the monitoring target portion TG in the three-dimensional space of the cabin 101. If the monitoring target portion TG is a hand of the monitoring target person OB, the estimation unit 83 calculates three-dimensional coordinates of the right and left hands from human body part of the human body model OBM. The three-dimensional coordinates of the hand include, for example, center coordinates of the hand, coordinates of any one or more points of the hand, or the like. The estimation unit 83 associates the calculated three-dimensional coordinates of the monitoring target portion TG with a frame of the depth image and stores them in the memory unit 81. Furthermore, for example, when the depth image captured by the imaging unit 3 does not include the hand of the monitoring target person OB, the estimation unit 83 may focus on a position of the human body part such as a shoulder or an elbow of the monitoring target person OB and a size and posture of the monitoring target person OB, and estimate the three-dimensional coordinates of the hand of the monitoring target person OB from the focused human body part.

The monitoring unit 84 monitors a motion of the monitoring target portion TG of the human body model OBM approaching the monitoring coordinate of the cabin 101 on the basis of the human body model OBM of the monitoring target person OB estimated by the estimation unit 83. For example, when the monitoring target person OB gets off the vehicle 100, the monitoring target person OB opens the door 110 by manipulating the door knob 120 of the door 110. For this reason, when the get-off motion of the monitoring target person OB is monitored, the monitoring system 1 sets the three-dimensional coordinates of the door knob 120 in the three-dimensional space of the cabin 101 as the monitoring coordinate of the door 110. The monitoring coordinate includes, for example, a range of three-dimensional coordinates corresponding to the contour of the door knob 120, three-dimensional coordinates corresponding to an arbitrary point of the door knob 120, or the like. In addition, the monitoring unit 84 monitors a motion of approaching the monitoring coordinate of the monitoring target portion TG on the basis of the three-dimensional coordinates of the monitoring target portion TG in time series. For example, the monitoring unit 84 estimates an optical flow of the monitoring target portion TG, and monitors a motion of approaching the monitoring coordinate of the monitoring target portion TG on the basis of the optical flow. Note that a method of estimating the optical flow of the monitoring target portion TG may include, for example, the Lucas Kanade method, the Horn-Schunk method, or the like. When a distance between the three-dimensional coordinates of the monitoring target portion TG of the human body model OBM and the monitoring coordinate of the door knob 120 becomes smaller than a determination threshold, the monitoring unit 84 detects the motion of the monitoring target portion TG approaching the monitoring coordinate as a get-off motion. Note that the monitoring unit 84 may detect, as the get-off motion of the monitoring target portion TG, a case where the three-dimensional coordinates of the monitoring target portion TG of the human body model OBM reaches the monitoring coordinate of the door knob 120. The monitoring unit 84 stores, in the monitoring result information 81b, information representing detection of the get-off motion of the monitoring target portion TG approaching the monitoring coordinate. The monitoring unit 84 may store, in the monitoring result information 81b, the three-dimensional coordinates used in detection of the get-off motion of the monitoring target portion TG approaching the monitoring coordinate while associating them with the monitoring result.

The operation controller 85 is a part capable of executing an operation control process. The operation control process is a process for controlling operations of each unit of the monitoring system 1, such as the imaging unit 3, the output unit 4, the illumination unit 5, the manipulation unit 6, and the alarming unit 9. The operation controller 85 is electrically connected to the imaging unit 3, the output unit 4 (including the display unit 41 and the loudspeaker 42), the illumination unit 5, the manipulation unit 6, the external connection unit 7, and the memory unit 81. The operation controller 85 may control the operation of the imaging unit 3 by outputting a driving signal to the imaging unit 3 to start or terminate capturing of the depth image containing the monitoring target person OB. In addition, the operation controller 85 may control the operation of the output unit 4 by outputting a driving signal to the output unit 4 (including the display unit 41 and the loudspeaker 42) to display visual information on the display unit 41 or output auditory information from the loudspeaker 42. Furthermore, the operation controller 85 may control the operation of the illumination unit 5 by outputting a driving signal to the illumination unit 5 to turn on or off the illumination unit 5. Moreover, the operation controller 85 may receive a manipulation input on the manipulation unit 6 on the basis of the manipulation signal input from the manipulation unit 6 to switch on or off the illumination unit 5, change display content on the display unit 41, or perform various settings. The operation controller 85 may output a support request signal to the brake ECU 201, the advanced driver assistance system ECU 202, or the like via the external connection unit 7 and obtain the vehicle information, the surrounding situation information, or the like described above. The operation controller 85 may control the operation of the alarming unit 9 by outputting a driving signal to the alarming unit 9 via the external connection unit 7.

The operation controller 85 performs a process corresponding to the get-off motion when the monitoring unit 84 detects the get-off motion of the monitoring target portion TG approaching the monitoring coordinate. The operation controller 85 may execute a process of causing the alarming unit 9 to warn the fact that the monitoring target portion TG approaches the monitoring coordinate, as the process corresponding to the get-off motion of the monitoring target portion TG approaching the monitoring coordinate. The operation controller 85 may execute a process of outputting, from the output unit 4, alarm information for warning the driver or the like about the fact that the monitoring target portion TG approaches the monitoring coordinate as the process corresponding to the motion of the monitoring target portion TG approaching the monitoring coordinate.

When the get-off motion of the monitoring target portion TG approaching the monitoring coordinate is monitored, the operation controller 85 may obtain the vehicle information, the surrounding situation information, or the like described above via the external connection unit 7. The operation controller 85 has a function of determining whether or not the vehicle 100 is in a stop state on the basis of the obtained vehicle information. The operation controller 85 has a function of determining whether or not another vehicle approaches the vehicle 100 on the basis of the obtained surrounding situation information.

When the vehicle 100 is in the stop state, when another vehicle approaches the vehicle 100, or when the get-off motion of the monitoring target portion TG approaching the monitoring coordinate is detected by the monitoring unit 84, the operation controller 85 may cause the alarming unit 9 to warn the fact that another vehicle approaches the host vehicle.

Figure 6:
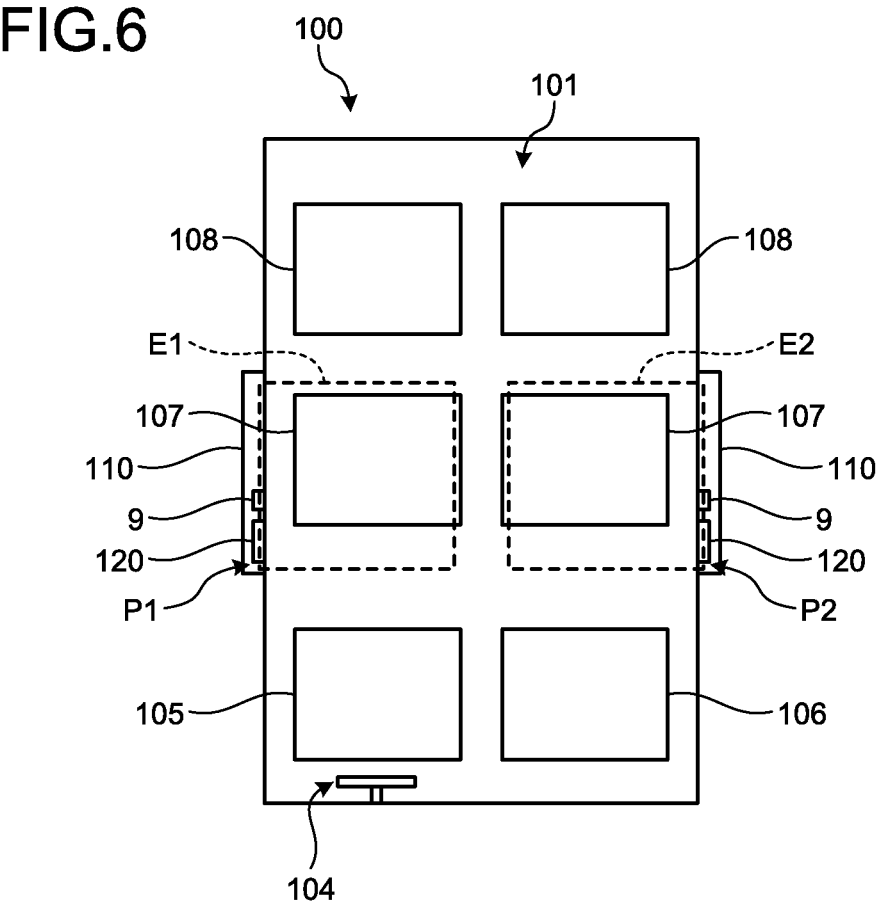
FIG. 6 is a schematic diagram illustrating an exemplary cabin monitored by the monitoring system according to an embodiment.

Next, an exemplary three-dimensional space of the cabin 101 monitored by the monitoring system 1 will be described with reference to FIG. 6. FIG. 6 is a schematic diagram illustrating an exemplary cabin monitored by the monitoring system 1 according to an embodiment.

As illustrated in FIG. 6, the monitoring system 1 monitors the cabin 101 as a monitoring target three-dimensional space. The monitoring system 1 monitors a get-off motion of the monitoring target person OB who tries to get off the vehicle 100 from the rear door 110. In this case, the monitoring system 1 stores, in the memory unit 81, the condition information 81a including the monitoring coordinates P1 and P2 indicating a position of the door knob 120 in the monitoring target three-dimensional space in advance. According to this embodiment, the condition information 81a contains information representing the three-dimensional monitoring regions E1 and E2 corresponding to the monitoring coordinates P1 and P2, respectively. The monitoring region E1 is, for example, an area of the cabin 101 serving as a get-off motion determination target for the right door 110 of the vehicle 100. The monitoring region E2 is, for example, an area of the cabin 101 serving as a get-off motion determination target for the left door 110 of the vehicle 100. In the example of FIG. 6, the monitoring region E1 becomes an area including the backseat 107 and the door knob 120 with respect to the monitoring coordinate P1 of the door knob 120 of the right door 110 of the cabin 101. In addition, the monitoring region E2 becomes an area including the left backseat 107 and the door knob 120 of the cabin 101 with respect to the monitoring coordinate P2 of the door knob 120 of the left door 110 of the cabin 101.

Although the condition information 81a is described for a case where the monitoring regions E1 and E2 are set for the right and left backseats 107 in this embodiment, the invention is not limited thereto. For example, in the condition information 81a, the three-dimensional region including both the monitoring coordinates P1 and P2 and two second row back seats 107 of the cabin 101 may be set as the monitoring region. In other words, the monitoring region of a monitoring information 810 may be set suitably depending on an arrangement relationship between the seats of the cabin 101 and the door 110 of the vehicle 100.

Figure 7:
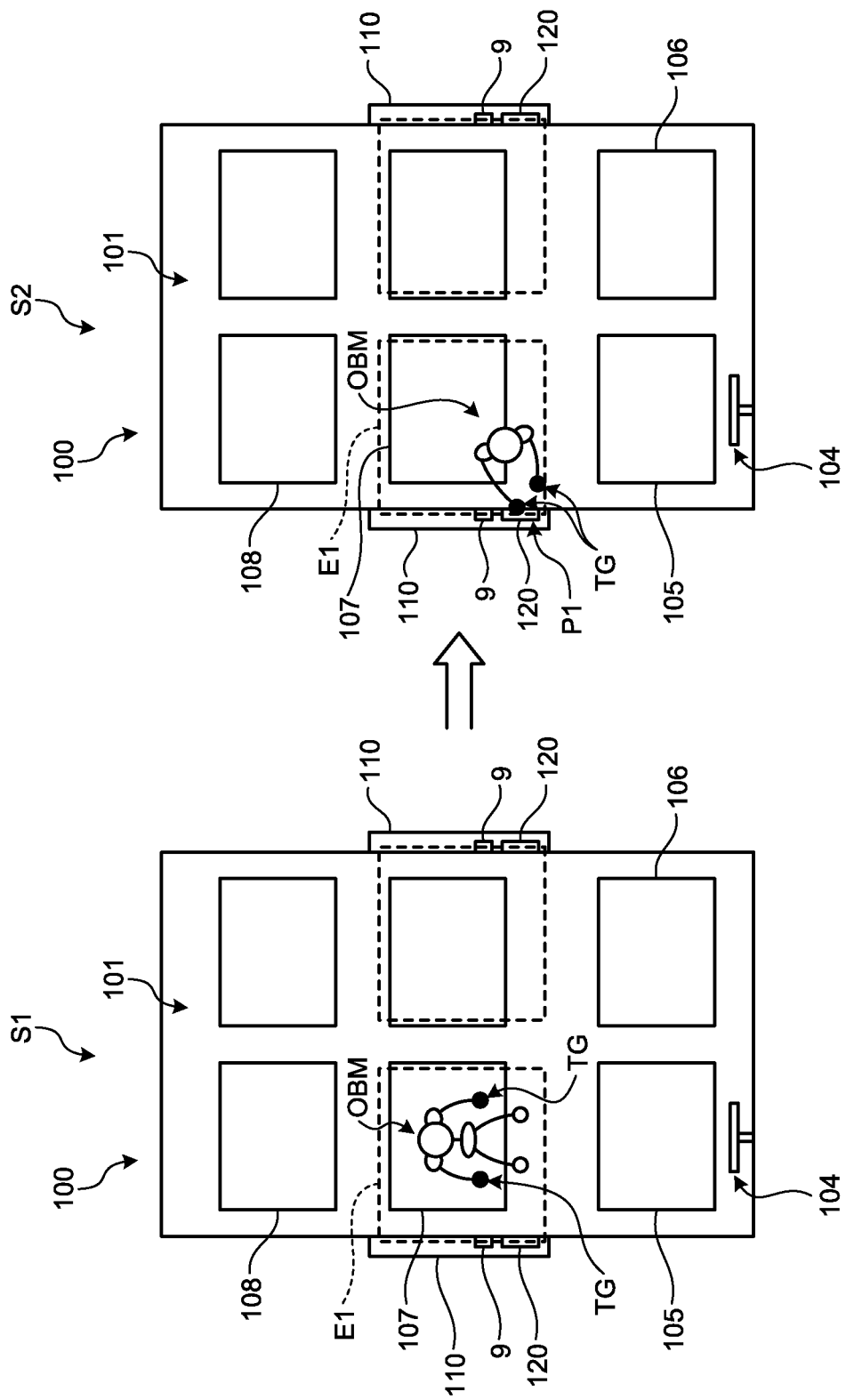
FIG. 7 is a diagram illustrating an example of monitoring a get-off motion of the monitoring system according to an embodiment.

Next, an example of monitoring the get-off motion of the monitoring system 1 according to this embodiment will be described with reference to FIG. 7. FIG. 7 is a diagram illustrating arm example of monitoring the get-off motion of the monitoring system 1 according to an embodiment.

In the scene of Step S1 of FIG. 7, the monitoring target person OB is seated on the right backseat 107 of the cabin 101 in a posture directed to a travel direction of the vehicle 100. Note that it is assumed that the vehicle 100 is in a travel state.

In the scene of Step S1, the imaging unit 3 of the monitoring system 1 captures a depth image containing the monitoring target person OB seated on the right backseat 107. The estimation unit 83 of the monitoring system 1 estimates a human body model OBM of the monitoring target person OB seated on the backseat 107 from the depth image. In addition, the estimation unit 83 specifies the monitoring target portion TG from the estimated human body model OBM, calculates the three-dimensional coordinates of the monitoring target portion TG in the cabin 101, and stores the three-dimensional coordinates of the calculated monitoring target portion TG in the memory unit 81 in time series. Furthermore, the monitoring unit 84 monitors a motion of the monitoring target portion TG of the human body model OBM approaching the monitoring coordinate P1 of the cabin 101 on the basis of the human body model OBM estimated by the estimation unit 83. In this case, the monitoring unit 84 stores a monitoring result representing that the get-off motion is not detected in the monitoring result information 81b because the monitoring target portion TG stays in the monitoring region E1 and is not directed to the monitoring coordinate P1 on the basis of the time-series three-dimensional coordinates of the monitoring target portion TG. Furthermore, the monitoring unit 84 continuously monitors the get-off motion of the monitoring target portion TG.

Then, in the scene of Step S2 of FIG. 7, the monitoring target person OB makes a motion of moving the monitoring target hand toward the door knob 120 of the right door 110 from the right backseat 107. In this case, the vehicle 100 changes from the travel state to the stop state. In addition, another vehicle approaches the vehicle 100 having the stop state, for example, from the rear side.

In the example of Step S2, the imaging unit 3 of the monitoring system 1 captures a depth image containing the monitoring target person OB who changes a posture on the right backseat 107 and moves the hand toward the door knob 120. The estimation unit 83 of the monitoring system 1 estimates the human body model OBM of the monitoring target person OB who moves the hand on the backseat 107 from the depth image. In addition, the estimation unit 83 specifies the monitoring target portion TG from the estimated human body model OBM, calculates three-dimensional coordinates of the monitoring target portion TG, and stores the calculated three-dimensional coordinates of the monitoring target portion TG in the memory unit 81 in time series. Furthermore, if a monitoring motion in which the monitoring target portion TG of the human body model OBM approaches the monitoring coordinate P1 of the cabin 101 is detected on the basis of the human body model OBM estimated by the estimation unit 83, the monitoring unit 84 stores, in the monitoring result information 81b, a monitoring result representing detection of the get-off motion. Specifically, the monitoring unit 84 detects a case where the monitoring target portion TG stays in the monitoring region P1, and the distance between the monitoring coordinate P1 and the three-dimensional coordinates of the monitoring target portion TG becomes smaller than the determination threshold, as the get-off motion, on the basis of the time-series three-dimensional coordinates of the monitoring target portion TG. Moreover, if the vehicle information described above is obtained via the external connection unit 7, and the vehicle information indicates the stop state, the operation controller 85 detects that the vehicle 100 has the stop state. If the surrounding situation information described above is obtained via the external connection unit 7, the operation controller 85 detects that another vehicle approaches the vehicle 100. In this case, the operation controller 85 detects the stop state of the vehicle 100 when the get-off motion is detected on the basis of the monitoring result of the monitoring unit 84. Meanwhile, the operation controller 85 detects another vehicle approaching the vehicle 100. Therefore, the operation controller 85 executes a process for causing the alarming unit 9 to warn about approach of another vehicle to the vehicle 100. As a result, the monitoring system 1 can warn the monitoring target person OB who tries to manipulate the door knob 120 of the door 110 using the alarming unit 9 about approach of another vehicle. That is, the monitoring system 1 can warn of approach of another vehicle using the alarming unit 9 before the monitoring target person OB gets off the vehicle 100.

For example, it is assumed that the monitoring target person OB seated on the third row right backseat 108 in the cabin 101 of FIG. 6 moves to the door knob 120 of the right door 110 outside the monitoring region E1 to get off.

In this case, the imaging unit 3 of the monitoring system 1 captures a depth image including the monitoring target person OB who starts to move from the right backseat 108. The estimation unit 83 of the monitoring system 1 estimates the human body model OBM of the monitoring target person OB from the depth image. In addition, the estimation unit 83 specifies the monitoring target portion TG from the estimated human body model OBM, calculates the three-dimensional coordinates of the monitoring target portion TG in the cabin 101, and stores the calculated three-dimensional coordinates of the monitoring target portion TG in the memory unit 81 in time series. Furthermore, the monitoring unit 84 monitors a motion of the monitoring target portion TG of the human body model OBM approaching the monitoring coordinate P1 in the cabin 101 on the basis of the human body model OBM estimated by the estimation unit 83. However, the monitoring unit 84 stores the monitoring result indicating that the get-off motion is not detected in the monitoring result information 81b on the basis of the time-series three-dimensional coordinates of the monitoring target portion TG because the monitoring target portion TG is positioned outside the monitoring region E1, and the distance to the monitoring coordinate P1 is larger than the determination threshold. In addition, the monitoring unit 84 continuously monitors the motion of the monitoring target portion TG.

Then, in a case where the distance between the monitoring target portion TG and the monitoring coordinate P1 becomes smaller than the determination threshold while the monitoring target portion TG is positioned in the monitoring region E1, the monitoring unit 84 of the monitoring system 1 stores, in the monitoring result information 81b, a monitoring result indicating that a monitoring motion representing detection of the get-off motion is detected.

In the monitoring system 1 described above, the estimation unit 83 estimates the three-dimensional human body model OBM of the monitoring target person OB from the depth image captured by the imaging unit 3 to monitor a motion of the monitoring target portion TG of the human body model OBM approaching the monitoring coordinate P1 in the cabin 101. As a result, since the monitoring system 1 can monitor a motion of the monitoring target portion TG of the three-dimensional human body model OBM approaching the monitoring coordinate P1 in the cabin 101, it is possible to accurately recognize the get-off motion of the monitoring target person OB.

In the monitoring system 1, the monitoring unit 84 monitors a motion of the monitoring target portion TG positioned in the monitoring region E1 of the cabin 101 approaching the monitoring coordinate P1 with respect to the monitoring coordinate P1. In addition, the monitoring system 1 does not detect a motion of the monitoring target portion TG positioned outside the monitoring region E1 approaching the monitoring coordinate P1 as the get-off motion. As a result, the monitoring system 1 can more accurately monitor the motion of the monitoring target because the motion of the monitoring target member TG approaching the monitoring coordinate P1 of the monitoring region E1 outside the monitoring region E1 can be excluded from the get-off motion.

In the monitoring system 1, the monitoring coordinate P1 is three-dimensional coordinates of the door knob 120 in the cabin 101, and the monitoring target portion TG is a hand of the monitoring target person OB. As a result, the monitoring system 1 can monitor a motion of the hand of the monitoring target person OB approaching the door knob 120 on the basis of the three-dimensional human body model OBM of the estimated monitoring target person OB, so that it is possible to more accurately monitor the get-off motion in which the monitoring target person OB tries to open the door 110.

When the operation controller 85 detects the get-off motion on the basis of the monitoring result of the monitoring unit 84, the monitoring system 1 performs a process corresponding to the get-off motion. As a result, when a motion of the monitoring target portion TG approaching the monitoring coordinate P1 is detected, the monitoring system 1 can execute the process corresponding to the get-off motion. Therefore, it is possible to provide a service corresponding to the get-off motion and improve convenience.

When the operation controller 85 detects the get-off motion on the basis of the monitoring result of the monitoring unit 84, and the vehicle 100 is in the stop state, the monitoring system 1 performs a process corresponding to the get-off motion. As a result, the monitoring system 1 can execute the process corresponding to the get-off motion when the vehicle 100 is in the stop state. Therefore, it is possible to provide a service suitable for the get-off motion in the stop state of the vehicle 100 and further improve convenience.

When the operation controller 85 detects the get-off motion on the basis of the monitoring result of the monitoring unit 84, and another vehicle approaches the vehicle 100, the monitoring system 1 performs a process of causing the alarming unit 9 to warn about approach of another vehicle. As a result, when the get-off motion is detected, the monitoring system 1 can warn the monitoring target person OB about approach of another vehicle. Therefore, it is possible to prevent, in advance, an accident that may occur during an opening operation of the door 110 and improve safety of the monitoring target person OB.

Since each unit of the monitoring system 1 including the imaging unit 3 and the controller 8 is provided inside the casing 2, it is possible to modularize the entire monitoring system 1 as an over-head module. In this configuration, it is possible to improve mountability of the monitoring system 1 on the vehicle 100. Note that, since the alarming unit 9 is provided in the vicinities of the monitoring coordinates P1 and P2 outside the casing 2, the monitoring system 1 can allow the monitoring target person OB to quickly recognize the warning.

Figure 8:
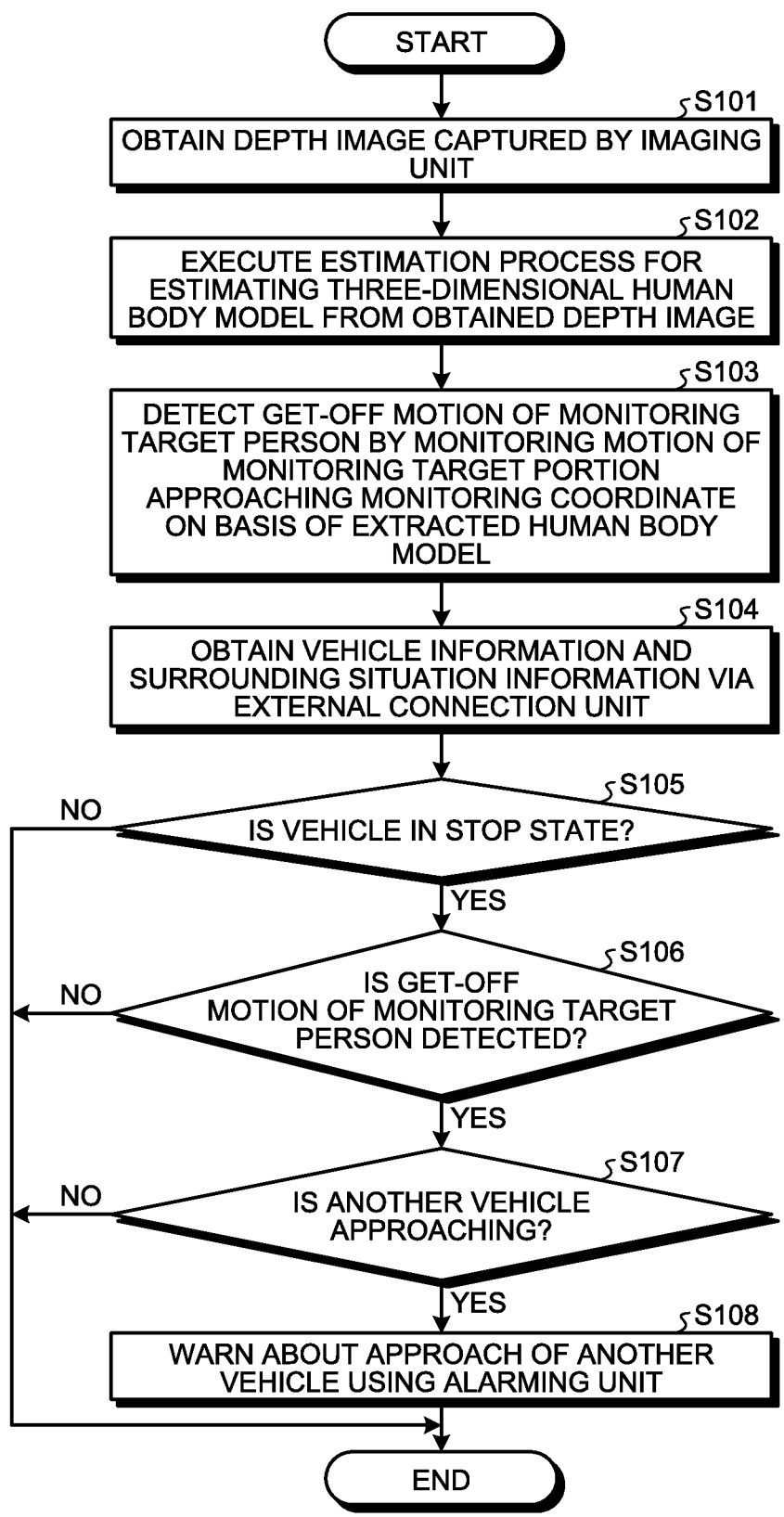
FIG. 8 is a flowchart illustrating an exemplary control of a controller of the monitoring system according to an embodiment.

Next, an exemplary control of the processing unit 82 of the controller 8 will be described with reference to the flowchart of FIG. 8. FIG. 8 is a flowchart illustrating an exemplary control of the controller of the monitoring system according to an embodiment. The flowchart of FIG. 8 illustrates an exemplary processing sequence regarding monitoring for the get-off motion of the monitoring target person OB. The processing sequence of FIG. 8 is implemented by causing the processing unit 82 to execute a program. The processing sequence of FIG. 8 is repeatedly executed by the processing unit 82.

First, the processing unit 82 of the controller 8 of the monitoring system 1 obtains the depth image captured by the imaging unit 3 (Step S101). In addition, the processing unit 82 executes an estimation process for estimating the three-dimensional human body model OBM from the obtained depth image (Step S102). For example, by executing the estimation process, the processing unit 82 extracts the monitoring target person OB on the basis of coordinate values of each point indicated by the three-dimensional point group data of the depth image, estimates the human body model OBM by focusing on the skeletal position of the monitoring target person OB, and extracts the monitoring target portion TG from the human body model OBM. Note that the estimation process will be described below in more details. The processing unit 82 functions as the estimation unit 83 described above by executing the process of Step S102. The processing unit 82 advances the process to Step S103 as the estimation process is terminated.

The processing unit 82 monitors a motion of the monitoring target portion TG approaching the monitoring coordinate on the basis of the extracted human body model OBM, detects a get-off motion of the monitoring target person OB, and detects the get-off motion of the monitoring target person OB (Step S103). For example, the processing unit 82 determines whether or not the distance between the three-dimensional coordinates of the monitoring target portion TG and the monitoring coordinates P1 and P2 of the condition information 81a becomes smaller than the determination threshold. Note that the processing unit 82 may determine whether or not the three-dimensional coordinates of the monitoring target portion TG reaches the monitoring coordinate of the door knob 120. For example, the processing unit 82 determines that the distance between the three-dimensional coordinates of the monitoring target portion TG and the monitoring coordinate P1 of the condition information 81a becomes smaller than the determination threshold. In this case, due to the motion of the monitoring target portion TG approaching the monitoring coordinate P1, the processing unit 82 stores, in the monitoring result information 81b, the monitoring result indicating detection of the get-off motion of the monitoring target person OB. For example, the processing unit 82 determines that the distance between the three-dimensional coordinates of the monitoring target portion TG and the monitoring coordinate P1 of the condition information 81a is not smaller than the determination threshold. In this case, since the motion of the monitoring target portion TG approaching the monitoring coordinate P1 does not occur, the processing unit 82 stores, in the monitoring result information 81b, the monitoring result indicating that the get-off motion of the monitoring target person OB is not detected. The processing unit 82 functions as the aforementioned monitoring unit 84 by executing the process of Step S103. As the monitoring target portion TG is extracted, the processing unit 82 advances the process to Step S104.

The processing unit 82 obtains the vehicle information and the surrounding situation information via the external connection unit 7 (Step S104). The processing unit 82 advances the process to Step S105 as the obtained vehicle information and the surrounding situation information are temporarily stored in the memory unit 81.

The processing unit 82 determines whether or not the vehicle 100 is in the stop state (Step S105). For example, if the vehicle information obtained in Step S105 indicates the stop state, the processing unit 82 determines that the vehicle 100 is in the stop state. If it is determined that the vehicle 100 is not in the stop state (No in Step S105), the processing unit 82 terminates the processing sequence of FIG. 8. If it is determined that the vehicle 100 is in the stop state (Yes in Step S105), the processing unit 82 advances the process to Step S106.

The processing unit 82 determines whether or not the get-off motion of the monitoring target person OB is detected (Step S106). For example, if the monitoring result of the monitoring result information 81b indicates that the get-off motion of the monitoring target person OB is detected, the processing unit 82 determines that the get-off motion of the monitoring target person OB is detected. If it is determined that the get-off motion of the monitoring target person OB is not detected (No in Step S106), the processing unit 82 terminates the processing sequence of FIG. 8. If it is determined that the get-off motion of the monitoring target person OB is detected (Yes in Step S106), the processing unit 82 advances the process to Step S107.

The processing unit 82 determines whether or not another vehicle is approaching (Step S107). For example, if the surrounding situation information obtained in Step S104 indicates another vehicle around the vehicle 100, the processing unit 82 determines that another vehicle is approaching. If it is determined that another vehicle is not approaching (No in Step S107), the processing unit 82 terminates the processing sequence of FIG. 8. If it is determined that another vehicle is approaching (Yes in Step S107), the processing unit 82 advances the process to Step S108.

The processing unit 82 causes the alarming unit 9 to warn about approach of another vehicle (Step S108). For example, the processing unit 82 specifies the alarming unit 9 provided in the vicinity of the monitoring coordinate and causes the alarming unit 9 to warn about approach of another vehicle via the external connection unit 7. As a result, the alarming unit 9 provided in the vicinity of the monitoring coordinate warns the monitoring target person OB about approach of another vehicle by emitting light from the alarming unit 9. The processing unit 82 functions as the operation controller 85 by executing a series of processes of Steps S105 to S108. In addition, the processing unit 82 terminates the processing sequence of FIG. 8 if the alarming unit 9 performs the warning.

Figure 9:
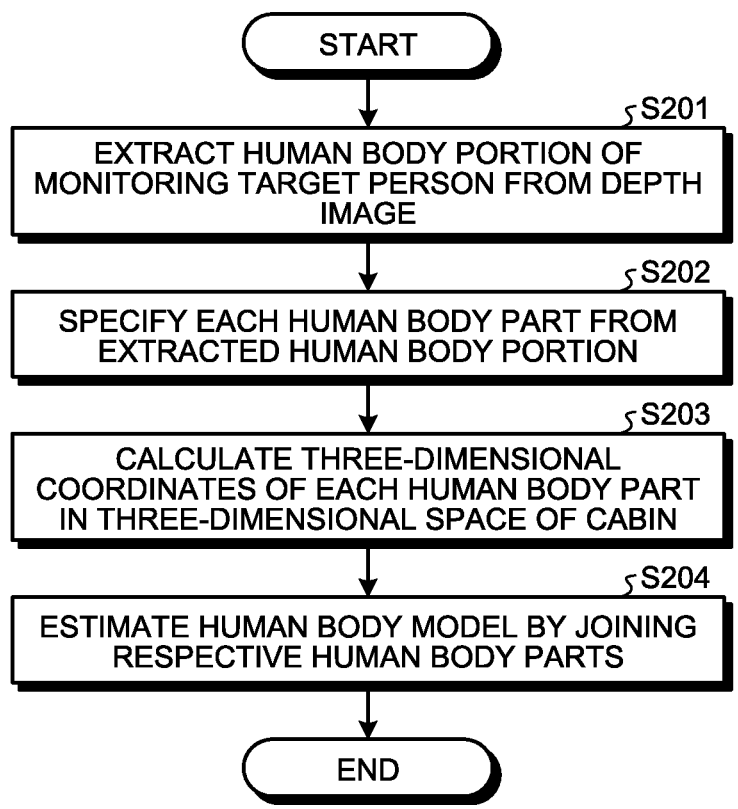
FIG. 9 is a flowchart illustrating an exemplary process for estimating a human body model in the monitoring system according to an embodiment.

Next, an exemplary process of estimating the human body model OBM using the processing unit 82 of the controller 8 will be described with reference to the flowchart of FIG. 9. FIG. 9 is a flowchart illustrating an exemplary process of estimating the human body model OBM of the monitoring system 1 according to an embodiment. The flowchart of FIG. 9 illustrates an exemplary processing sequence regarding a method of estimating the human body model OBM. The processing sequence of FIG. 9 is implemented as the processing unit 82 executes a program. The processing sequence of FIG. 9 is activated as the processing unit 82 executes Step S102 of FIG. 8.

First, the processing unit 82 of the controller 8 of the monitoring system 1 extracts a human body portion of the monitoring target person OB from the depth image (Step S201). For example, the processing unit 82 compares the three-dimensional point group data of the depth image captured by the imaging unit 3 and the three-dimensional point group data of the cabin 101 prepared in advance using the background subtraction method known in the art, and extracts the three-dimensional point group that does not exist in the three-dimensional point group data of the cabin 101 as the human body portion. As the human body portion is extracted, the processing unit 82 advances the process to Step S202.

The processing unit 82 specifies each human body part from the extracted human body portion (Step S202). For example, the processing unit 82 specifies a predetermined human body part such as a head, a shoulder, an elbow, a hand, a hip, a knee, or a foot from the human body portion using the random forest method known in the art. If it is difficult to specify all of the human body parts on the basis of a direction, a posture, or the like of the monitoring target person OB, the processing unit 82 specifies specifiable human body parts. If the specifying operation is terminated, the processing unit 82 advances the process to Step S203.

The processing unit 82 calculates the three-dimensional coordinates of each human body part in the three-dimensional space of the cabin 101 (Step S203). For example, the processing unit 82 calculates each center of the human body parts using the mean shift method known in the art, and calculates the three-dimensional coordinates of the human body parts on the basis of the calculated coordinate values of the center and the coordinate values of each point indicated by the three-dimensional point group data of the depth image. The processing unit 82 advances the process to Step S204 if the three-dimensional coordinates of each human body part are calculated.

The processing unit 82 estimates the human body model OBM by joining respective human body parts (Step S204). The processing unit 82 terminates the processing sequence of FIG. 9 as the information indicating the human body model OBM in the estimated three-dimensional space of the cabin 101 is stored in the memory unit 81.

Note that the monitoring system 1 according to the embodiment of the invention described above is not limited to the aforementioned embodiments, various changes may be possible within the scope described in the claims.

Modifications of Embodiment

Modifications of the embodiment will be described. Another exemplary control of the processing unit 82 of the controller 8 in the monitoring system 1 according to the embodiment will be described with reference to the flowchart of FIG. 10. In the following description, like reference numerals denote like elements as in the processing sequence of the monitor system 1. In addition, a repeated description will be omitted in some cases.

Figure 10:
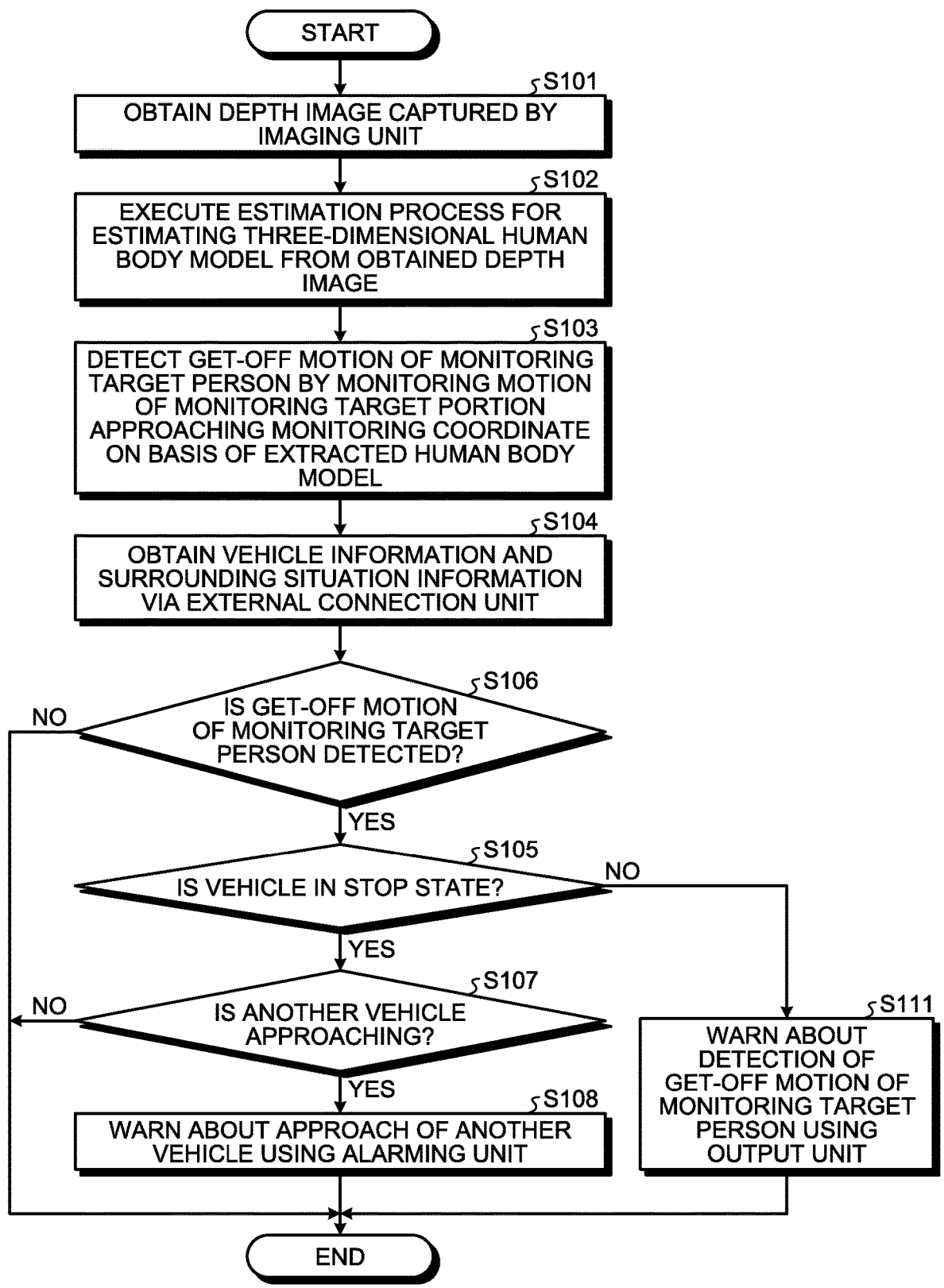
FIG. 10 is a flowchart illustrating another exemplary control of the controller of the monitoring system according to an embodiment.

FIG. 10 is a flowchart illustrating another exemplary control of the controller of the monitoring system according to the embodiment. The flowchart of FIG. 10 illustrates another exemplary processing sequence regarding monitoring of the get-off motion of the monitoring target person OB. The processing sequence of FIG. 10 is implemented as the processing unit 82 executes a program. The processing sequence of FIG. 10 is repeatedly executed by the processing unit 82.

First, the processing unit 82 of the controller 8 of the monitoring system 1 obtains the depth image captured by the imaging unit 3 (Step S101). In addition, the processing unit 82 executes the estimation process for estimating the three-dimensional human body model OBM from the obtained depth image (Step S102). The processing unit 82 monitors a motion of the monitoring target portion TG approaching the monitoring coordinate on the basis of the extracted human body model OBM to detect a get-off motion of the monitoring target person OB (Step S103). The processing unit 82 obtains the vehicle information and the surrounding situation information via the external connection unit 7 (Step S104). The processing unit 82 advances the process to Step S106 as the obtained vehicle information and the surrounding situation information are temporarily stored in the memory unit 81.

The processing unit 82 determines whether or not a get-off motion of the Monitoring target person OB is detected (Step S106). If it is determined that the get-off motion of the monitoring target person OB is not detected (No in Step S106), the processing unit 82 terminates the processing sequence of FIG. 10. If it is determined that the get-off motion of the monitoring target person OB is detected (Yes in Step S106), the processing unit 82 advances the process to Step S105.

The processing unit 82 determines whether or not the vehicle 100 is in the stop state (Step S105). If it is determined that the vehicle 100 has the stop state (Yes in Step S105), the processing unit 82 advances the process to Step S107. The processing unit 82 determines whether or not another vehicle is approaching (Step S107). If it is determined that another vehicle is not approaching (No in Step S107), the processing unit 82 terminates the processing sequence of FIG. 10. If it is determined that another vehicle is approaching (Yes in Step S107), the processing unit 82 advances the process to Step S108. In addition, the processing unit 82 causes the alarming unit 9 to warn about approach of another vehicle (Step S108). If the alarming unit 9 performs the warning, the processing unit 82 terminates the processing sequence of FIG. 10.

If the vehicle 100 is not in the stop state (No in Step S105), the processing unit 82 advances the process to Step S111 because the vehicle 100 is in the travel state. The processing unit 82 warns detection of the get-off motion of the monitoring target person OB using the output unit 4 (Step S111). For example, the processing unit 82 causes the display unit 41 of the output unit 4 to display alarm information for warning detection of the get-off motion of the monitoring target person OB and outputs a warning sound from the loudspeaker 42. As a result, the output unit 4 can inform the driver, other fellow passengers, or the like of the get-off motion of the monitoring target person OB. The processing unit 82 functions as the operation controller 85 by executing a series of processes of Steps S106, S105, and S111. In addition, the processing unit 82 terminates the processing sequence of FIG. 10 as the output unit 4 performs the warning.

As described above, the monitoring system 1 performs the process for warning the get-off motion of the monitoring target person OB when the operation controller 85 detects the get-off motion of the monitoring target person OB on the basis of the monitoring result of the monitoring unit 84, and the vehicle 100 is in the travel state. As a result, since the monitoring system 1 can execute a process for warning the get-off motion of the monitoring target person OB during a travel state of the vehicle 100, it is possible to prevent a fellow passenger from erroneously opening the door 110 during a travel of the vehicle 100 in advance.

Although a case where the monitoring unit 84 monitors a movement of the monitoring target portion TG in the monitoring regions E1 and E2 has been described in the aforementioned description, the invention is not limited thereto. For example, the monitoring unit 84 may monitor a motion of the monitoring target portion TG directed to the monitoring coordinate P1 or P2 without setting the monitoring regions E1 and E2.

Although the monitoring unit 84 monitors a motion of the occupant in the rear space as the monitoring target person OB of the cabin 101 of the vehicle 100 by way of example in the aforementioned description, the invention is not limited thereto. The monitoring target person OB may be a fellow passenger of the assistant's seat 106. In addition, although the monitoring target portion TG is a hand of the monitoring target person OB in the aforementioned description, the invention is not limited thereto. For example, the monitoring target portion TG may be an arm or the like.

Although the entire monitoring system 1 is provided on a surface of the cabin 101 side of the ceiling 102 in the vehicle 100 as an over-head module in the aforementioned description, the invention is not limited thereto. For example, the monitoring system 1 may be configured such that the controller 8 is provided outside the casing 2 and is electrically connected to each unit via a wiring material. For example, a vehicle ECU that comprehensively controls each unit of the vehicle 100 may also be used as the controller 8. In addition, for example, a display, a loudspeaker, or the like mounted on a rear space of the cabin 101 of the vehicle 100 may also be used as the alarming unit 9. The output unit 4 of the monitoring system 1 may also be used as the alarming unit.

In the monitoring system according to the present embodiments, the estimation unit estimates the three-dimensional human body model of the monitoring target person from the depth image captured by the imaging unit and monitors a get-off motion of the monitoring target person by monitoring a motion of the monitoring target portion of the human body model approaching the monitoring coordinate regarding a door manipulation in the cabin. As a result, since the monitoring system can monitor a motion of the monitoring target portion of the three-dimensional human body model approaching the monitoring coordinate in the cabin, it is possible to accurately recognize a get-off motion of the monitoring target person.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A monitoring system comprising:
    an imaging unit configured to capture a depth image including a distance to a monitoring target person in a cabin of a vehicle;
    an estimation unit configured to estimate a three-dimensional human body model of the monitoring target person from the depth image captured by the imaging unit by:
        extracting a human body portion of the monitoring target person from the depth image,
        specifying human body parts from the extracted human body portion,
        calculating three-dimensional coordinates of each of the specified human body parts, and
        joining the specified human body parts; and
    a monitoring unit configured to detect a get-off motion of the monitoring target person by monitoring a motion of a monitoring target portion of the three-dimensional human body model approaching a monitoring coordinate regarding a door manipulation in the cabin on the basis of the three-dimensional human body model estimated by the estimation unit.

2. The monitoring system according to claim 1, wherein the monitoring unit detects the get-off motion by monitoring a motion of the monitoring target portion positioned inside a monitoring region of the cabin approaching the monitoring coordinate with respect to the monitoring coordinate, and does not detect a motion of the monitoring target portion positioned outside the monitoring region approaching the monitoring coordinate as the get-off motion.

3. The monitoring system according to claim 2, wherein the monitoring coordinate includes three-dimensional coordinates of a door knob in the cabin, and
    the monitoring target portion is a hand of the monitoring target person.

4. The monitoring system according to claim 3, further comprising:
    an operation controller configured to perform a process corresponding to the get-off motion when the get-off motion is detected on the basis of a monitoring result of the monitoring unit.

5. The monitoring system according to claim 4, wherein the operation controller performs the process corresponding to the get-off motion when the get-off motion is detected on the basis of a monitoring result of the monitoring unit, and the vehicle is in a stop state.

6. The monitoring system according to claim 2, further comprising:
    an operation controller configured to perform a process corresponding to the get-off motion when the get-off motion is detected on the basis of a monitoring result of the monitoring unit.

7. The monitoring system according to claim 6, wherein the operation controller performs the process corresponding to the get-off motion when the get-off motion is detected on the basis of a monitoring result of the monitoring unit, and the vehicle is in a stop state.

8. The monitoring system according to claim 2, further comprising:
    a casing provided on a surface of a cabin side of a ceiling of the vehicle, the imaging unit and the monitoring unit being assembled to the casing.

9. The monitoring system according to claim 1, wherein the monitoring coordinate includes three-dimensional coordinates of a door knob in the cabin, and
    the monitoring target portion is a hand of the monitoring target person.

10. The monitoring system according to claim 9, further comprising:
    an operation controller configured to perform a process corresponding to the get-off motion when the get-off motion is detected on the basis of a monitoring result of the monitoring unit.

11. The monitoring system according to claim 10, wherein the operation controller performs the process corresponding to the get-off motion when the get-off motion is detected on the basis of a monitoring result of the monitoring unit, and the vehicle is in a stop state.

12. The monitoring system according to claim 9, further comprising:
    a casing provided on a surface of a cabin side of a ceiling of the vehicle, the imaging unit and the monitoring unit being assembled to the casing.

13. The monitoring system according to claim 1, further comprising:

an operation controller configured to perform a process corresponding to the get-off motion when the get-off motion is detected on the basis of a monitoring result of the monitoring unit.

14. The monitoring system according to claim 13, wherein
the operation controller performs the process corresponding to the get-off motion when the get-off motion is detected on the basis of a monitoring result of the monitoring unit, and the vehicle is in a stop state.

15. The monitoring system according to claim 14, further comprising:
an alarming unit provided in the cabin to perform warning to the monitoring target person, wherein
the operation controller causes the alarming unit to perform the process of warning about approach of an another vehicle when the get-off motion is detected on the basis of a monitoring result of the monitoring unit, and the another vehicle approaches the vehicle.

16. The monitoring system according to claim 14, further comprising:
a casing provided on a surface of a cabin side of a ceiling of the vehicle, the imaging unit and the monitoring unit being assembled to the casing.

17. The monitoring system according to claim 13, further comprising:
an alarming unit provided in the cabin to perform warning to the monitoring target person, wherein
the operation controller causes the alarming unit to perform the process of warning about approach of an another vehicle when the get-off motion is detected on the basis of a monitoring result of the monitoring unit, and the another vehicle approaches the vehicle.

18. The monitoring system according to claim 17, further comprising:
a casing provided on a surface of a cabin side of a ceiling of the vehicle, the imaging unit and the monitoring unit being assembled to the casing.

19. The monitoring system according to claim 1, further comprising:
a casing provided on a surface of a cabin side of a ceiling of the vehicle, the imaging unit and the monitoring unit being assembled to the casing.

20. The monitoring system according to claim 13, further comprising:
a casing provided on a surface of a cabin side of a ceiling of the vehicle, the imaging unit and the monitoring unit being assembled to the casing.

* * * * *